Figure 1:
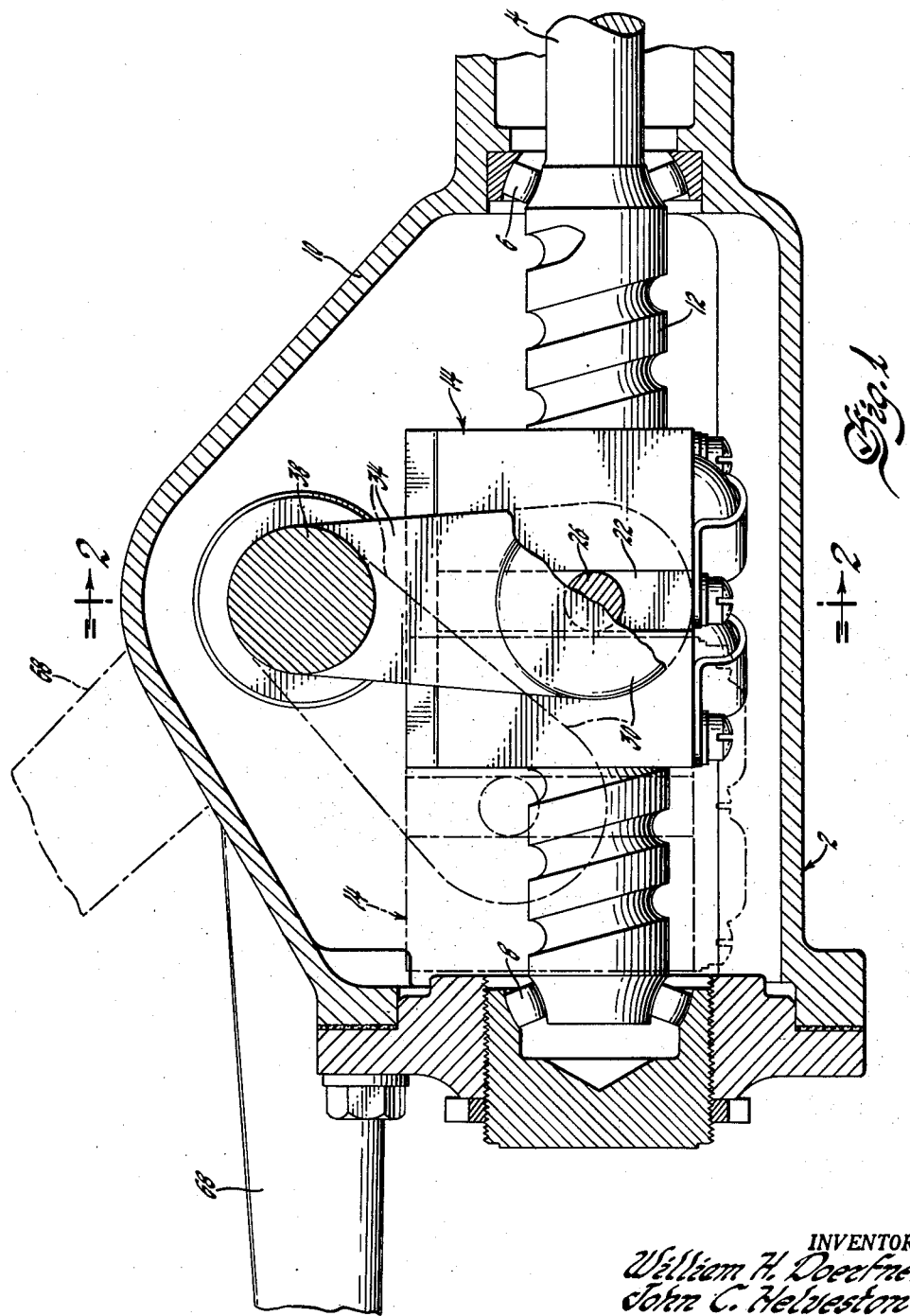

Aug. 18, 1953  W. H. DOERFNER ET AL  2,648,995
BALL NUT AND LEVER STEERING GEAR
Filed Oct. 18, 1951  2 Sheets-Sheet 1

INVENTORS
William H. Doerfner &
John C. Helveston
BY
Willits, Helmig & Baillio
ATTORNEYS Patented Aug. 18, 1953

2,648,995

UNITED STATES PATENT OFFICE 2,648,995

BALL NUT AND LEVER STEERING GEAR

William H. Doerfner and John C. Helveston, Saginaw, Mich., assignors to General Motors Corporation, Detroit, Mich., a corporation of Delaware Application October 18, 1951, Serial No. 251,952

10 Claims. (Cl. 74—499)

This invention relates to steering gears for motor and other types of vehicles and more particularly to steering gears of the ball nut and lever type.

In steering gears of the ball nut and lever type it is highly desirable to provide anti-friction means for the various operating parts thereof to reduce friction to a minimum in order that maximum efficiencies might be obtained. In order to provide for the most efficient operation, some clearance must be provided between the cooperating parts. Such clearance in certain prior constructions causes undesirable turning of the nut about its worm which results in binding or scuffing particularly of the connections between the nut and pitman shaft.

One object of the present invention is to provide in steering gears of the ball nut and lever type, improved anti-friction means between the contacting portions thereof, and also simplified and highly improved means for preventing undue turning of the nut about its worm. Steering gears constructed in this manner not only have operated at overall efficiencies of between eighty to ninety percent but the variation in the ratio thereof is greater than that of steering gears constructed heretofore.

Another object is to provide in a steering gear of the stated character, anti-friction pins on the spaced arms projecting from the pitman shaft which operate in transverse slots provided in the ball nut thereby greatly facilitating rocking of said pitman shaft by said nut during operation of said steering gear.

Another object is to provide in a steering gear of the stated character, annular abutment means on the pitman shaft which lies in close proximity to the adjacent side of the ball nut and thereby prevents undue turning of the latter about its worm.

Another object is to provide a steering gear of the stated character which is simple in structure, economical in manufacture, and highly efficient and durable in operation.

Other and further objects will become apparent as the description of the invention progresses.

Figure 2:
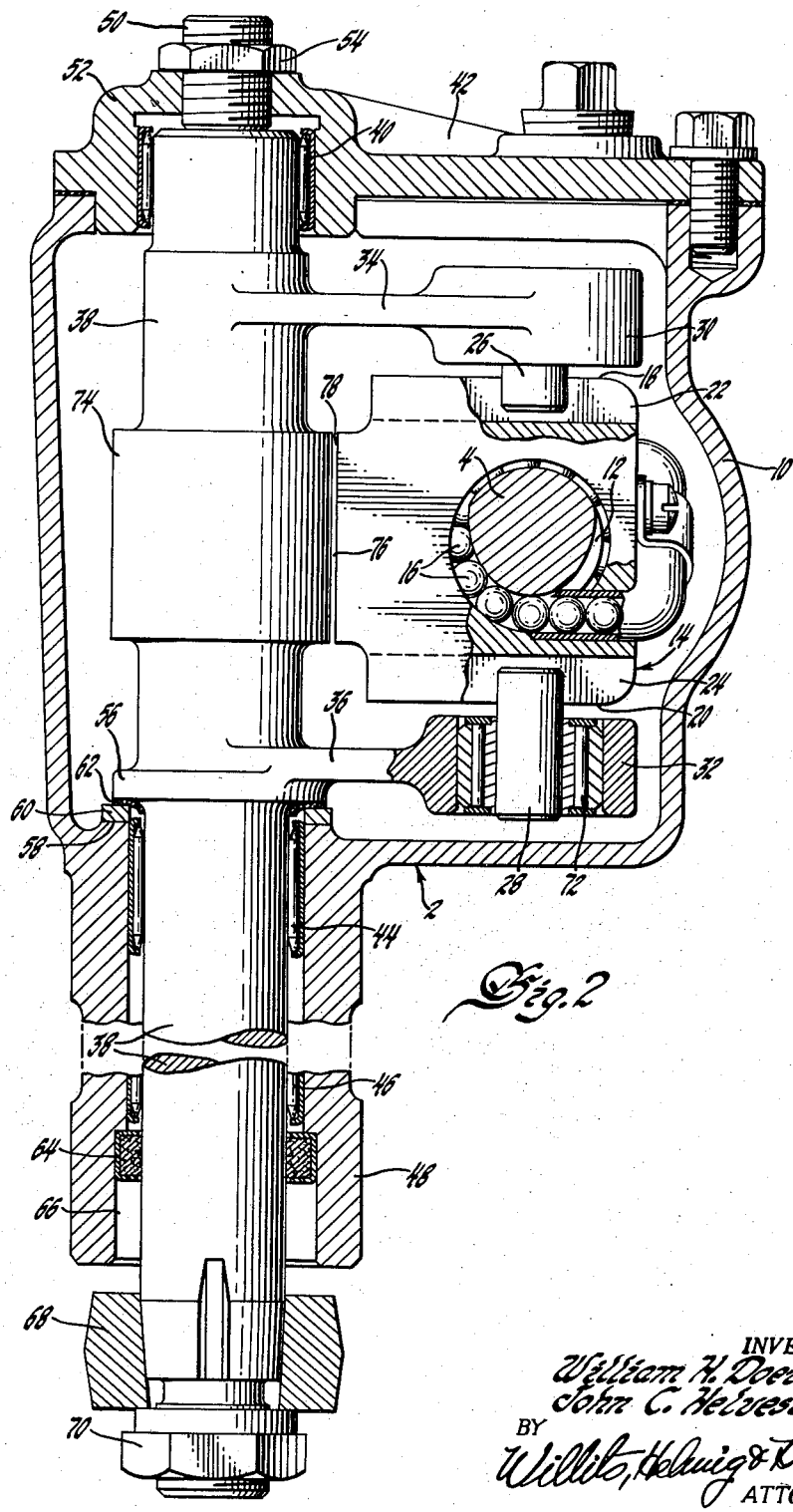

In the drawings,

Fig. 1 is a sectional view taken through the lower extremity of a steering gear showing the arrangement of the worm, the ball nut and the pitman shaft, and the operating connections therebetween, certain parts being broken away to more clearly show certain features thereof, and Fig. 2 is a sectional view taken substantially along line 2—2 of Fig. 1, certain parts being broken away to more clearly illustrate certain features of the invention.

Referring to the drawings, the numeral 2 indicates generally a portion of a steering gear of the ball nut and lever type comprising a steering shaft 4 mounted in thrust roller bearings 6 and 8 provided at the opposite ends of a housing 10. A worm 12 is provided on shaft 4 and extends between bearings 6 and 8, as shown more particularly at Fig. 1. Mounted on worm 12 is a ball nut structure 14 which is adapted for substantially nonrotatable movement between the ends of worm 12. The specific construction of worm 12 and ball nut 14 as well as the operation thereof is old in the art and, accordingly, a detailed description thereof will not be given herein. For a complete disclosure of such a mechanism reference may be had to United States Patent No. 2,380,662, granted to R. P. Means, Jr., on July 31, 1945. Suffice it to say that upon actuation of shaft 4 in one direction, the nut 14 will move to the left (Fig. 1) and upon actuation of said shaft in the reverse direction, the nut 14 will move to the right, the balls 16 disposed between nut 14 and worm 12 providing a highly efficient anti-friction bearing for said worm and nut.

Disposed in axial alignment at opposite sides 18 and 20 of nut structure 14 are transverse slots 22 and 24, respectively. Slots 22 and 24 receive pins 26 and 28 mounted in the outer ends 30 and 32 of a pair of arms 34 and 36, respectively, secured in spaced relation on a pitman shaft 38. Pitman shaft 38 is disposed at substantially right angles to shaft 4 and worm 12 and is mounted at one end in a needle-type roller bearing 40 provided in a cover 42 of housing 10, and at the other end in a pair of spaced needle bearings 44 and 46 provided in the tubular extension 48 of said housing. Pitman shaft 38 is held against axial movement in one direction by a stud bolt 50 making threaded engagement with the upper end 52 of cap 42, said bolt being held in adjusted position by means of a lock nut 54. The pitman shaft 38 is held against axial movement in the opposite direction by a flange 56 disposed adjacent to an annular boss 58 provided interiorly of casing 10. A washer 60 and a gasket 62 are provided between flange 56 and boss 58. An annular seal 64 of any suitable construction is provided between the lower end of pitman shaft 38 and the inner annular wall 66 of extension 48 to prevent the escape of lubricant from the interior of casing 10 and extension 48. A pitman arm 68 is splined to the lower end of pitman shaft 38 and is held in position thereon by means of lock nut 70. Arm 68 is connected to the usual mechanism not shown which in turn is connected to steering knuckles mounted adjacent the front wheels of the vehicle.

In order to insure a minimum of friction between pins 26 and 28 and arms 34 and 36, anti-friction needle-type roller bearings 72 are provided in the outer portions 30 and 32, respectively, of said arms. It is seen therefore that the contacting surfaces between worm 12 and nut structure 14, pitman shaft 38 and its casing 10 and extension 48, as well as between pins 26 and 28 and arms 34 and 36, are provided with anti-friction bearings thereby insuring maximum efficiencies in the operation of the steering gear.

In order to prevent turning of nut structure 14 about worm 12 during operation of the steering gear, an enlarged annular portion 74 is provided on pitman shaft 38. Enlarged portion 74 is disposed between arms 34 and 36 and normally lies in slightly spaced relation, as shown at 76, with the adjacent side 78 of nut structure 14. The enlarged annular portion 74 as well as the adjacent side 78 of nut 14 is smooth and therefore little frictional resistance is encountered when contact is made therebetween. The pressure exerted on pins 26 and 28 by nut structure 14 during movement of the latter in either direction from a centered position on worm 12 will become equalized and there is little tendency for the nut to turn about said worm. However, as the parts approach their centered position the tendency to equalize the pressure on the pins 26 and 28 is not effective and, consequently, the nut may turn slightly about worm 12 bringing one or the other edges of the side 78 of nut 14 into contact with the enlarged annular portion 74 on pitman shaft 38. Upon continued movement of nut structure 14 toward its centered position sliding contact occurs between it and the enlarged portion 74 of shaft 38. This turning movement of nut 14, however, is insufficient to cause binding or scuffing of the pins 26 and 28 in slots 22 and 24, respectively, of nut structure 14.

Should it be desired to dampen the movement of the steering gear in its centered position, the portion of the thread of the worm 12 at the center thereof intermediate its ends may, for example, be made a trifle large. This would cause preloading of the balls 16 when the steering gear is in centered position, but said balls would be free to move in their races at all other positions thereof.

From the foregoing description it is seen that novel and simplified means have been provided for insuring the highest efficiencies in operation of the steering gear under all conditions. The anti-friction bearings provided between the contacting parts also insures easy as well as efficient operation of the device. Novel and simplified means have also been provided to prevent undue turning of the nut structure about its worm and thereby prevent binding or scuffing of the connections between the nut and pitman shaft.

While the invention has been described in connection with steering gears for motor and other vehicles, it is apparent that it is equally adapted for other uses as well wherein power transmission is desired. It will also be apparent that the invention as shown and described herein is subject to modification and change without departing from the spirit thereof. It therefore is to be understood that it is not intended to limit the invention to the single embodiment disclosed but only by the scope of the claims which follow.

We claim:

1. Power transmitting means, comprising, a worm, a nut mounted on said worm having a slot provided in at least one side thereof and disposed at an angle to the direction of movement of said nut, a shaft mounted adjacent said worm and at an angle thereto, an arm secured to said shaft, a pin mounted on said arm and extending into said slot whereby movement of said nut causes turning of said shaft, anti-friction bearing means for said pin, and interengaging means on said shaft and nut spaced from said arm for preventing undue turning of said nut about said worm.

2. Power transmitting means, comprising, a worm, a nut mounted on said worm and having a transverse slot in each of a pair of oppositely disposed sides thereof, a shaft mounted adjacent said worm and at an angle thereto, a pair of spaced substantially parallel arms secured to said shaft, substantially aligned pins mounted on said arms and extending into said slots, whereby movement of said nut along said shaft causes turning of said shaft, and anti-friction bearing means for said pins.

3. Power transmitting means, comprising, a worm, a nut mounted on said worm and having a transverse slot in each of a pair of oppositely disposed sides thereof, a shaft mounted adjacent said worm and at an angle thereto, a pair of spaced substantially parallel arms secured to said shaft, substantially aligned pins mounted on said arms and extending into said slots, whereby movement of said nut along said shaft causes turning of said shaft, anti-friction bearing means for said pins, and abutment means on said shaft disposed between said arms for preventing undue turning of said nut about said worm.

4. Power transmitting means, comprising, a worm, anti-friction bearing means for said worm, a ball nut mounted on said worm for substantially nonrotatable movement thereon, a rock shaft disposed at substantially right angles to said worm, anti-friction bearings for said shaft, said nut having a transverse slot provided in one side thereof, an arm secured to said shaft, a pin mounted in said arm and extending into said slot, whereby movement of said nut along said worm causes turning of said shaft, and anti-friction bearing means for said pin.

5. Power transmitting means, comprising, a worm, anti-friction bearing means for said worm, a ball nut mounted on said worm for substantially nonrotatable movement thereon, a rock shaft disposed at substantially right angles to said worm, anti-friction bearings for said shaft, said nut having a transverse slot provided in one side thereof, an arm secured to said shaft, a pin mounted in said arm and extending into said slot, whereby movement of said nut along said worm causes turning of said shaft, anti-friction bearing means for said pin, and annular abutment means on said shaft adapted to engage said nut to prevent undue turning of the latter about said worm.

6. Power transmitting means, comprising, a worm, anti-friction bearing means for said worm, a ball nut mounted on said worm for substantially nonrotatable movement thereon and having a transverse slot provided in each of a pair of oppositely disposed sides thereof, a rock shaft disposed at substantially right angles to said worm, anti-friction bearing means for said shaft, a pair of spaced substantially parallel arms secured to said shaft, a pin extending inwardly of each of said arms and extending into an associated one of said slots, whereby movement of said nut in one direction causes turning of said shaft about its axis in one direction and movement of said nut in the opposite direction causes turning of said shaft in the opposite direction, and anti-friction bearing means for said pins.

7. Power transmitting means, comprising, a worm, anti-friction bearing means for said worm, a ball nut mounted on said worm for substantially nonrotatable movement thereon and having a transverse slot provided in each of a pair of oppositely disposed sides thereof, a rock shaft disposed at substantially right angles to said worm, anti-friction bearing means for said shaft, a pair of spaced substantially parallel arms secured to said shaft, a pin extending inwardly of each of said arms and extending into an associated one of said slots, whereby movement of said nut in one direction causes turning of said shaft about its axis in one direction and movement of said nut in the opposite direction causes turning of said shaft in the opposite direction, anti-friction bearing means for said pins, and annular abutment means on said shaft disposed between said arms for preventing undue turning of said nut about said worm.

8. In a steering gear, a steering shaft having a worm provided thereon, a nut mounted on said worm and having a transverse slot provided in each of a pair of oppositely disposed sides thereof, a pitman shaft mounted adjacent said worm and being disposed at substantially a right angle thereto, a pair of spaced substantially parallel arms secured to said shaft, an inwardly extending pin mounted on each of said arms and adapted to extend into an associated one of said slots whereby reciprocatory movement of said nut along said worm imparts a rocking movement to said pitman shaft, anti-friction bearing means for each of said pins, and abutment means on said shaft disposed between said arms for preventing undue turning of said nut about said worm.

9. In a steering gear, a steering shaft having a worm thereon, anti-friction bearing means for said shaft and worm, a ball nut mounted on said worm for substantially nonrotatable movement therealong and having a transverse slot provided in at least one side thereof, a pitman shaft disposed at substantially right angles to said worm, anti-friction bearings for said pitman shaft, an arm secured to said shaft, a pin mounted in said arm and extending into said slot, whereby movement of said nut along said worm causes turning of said pitman shaft, and anti-friction bearing means for said pin.

10. In a steering gear, a steering shaft having a worm provided thereon, anti-friction bearing means for said worm, a ball nut mounted on said worm for substantially nonrotatable movement therealong and having a transverse slot provided in each of a pair of oppositely disposed sides thereof, a pitman shaft disposed at substantially right angles to said worm, anti-friction bearing means for said pitman shaft, a pair of spaced substantially parallel arms secured to said shaft, a pin extending inwardly of each of said arms, said pins being disposed in substantially axial alignment and extending into the said slots in said nut, whereby movement of said nut in one direction causes turning of said shaft about its axis in one direction and movement of said nut in opposite direction causes turning of shaft in opposite direction, anti-friction bearing means for said pins, and annular abutment means on said shaft disposed between said arms adapted to engage said nut to prevent undue turning of the latter about said worm.

WILLIAM H. DOERFNER.
JOHN C. HELVESTON.

References Cited in the file of this patent

UNITED STATES PATENTS

| Number | Name | Date |
|---|---|---|
| 695,222 | Mooers | Mar. 11, 1902 |
| 698,407 | Malicet et al. | Apr. 22, 1902 |
| 1,343,846 | Rapson | June 15, 1920 |
| 2,045,811 | Twyman | June 30, 1936 |

FOREIGN PATENTS

| Number | Country | Date |
|---|---|---|
| 640,315 | Great Britain | July 19, 1950 |